Oct. 30, 1962     R. W. OBARSKI ETAL     3,060,734
TIRE, WHEEL AND/OR BRAKE TESTING APPARATUS
Filed April 26, 1960                                   4 Sheets-Sheet 1
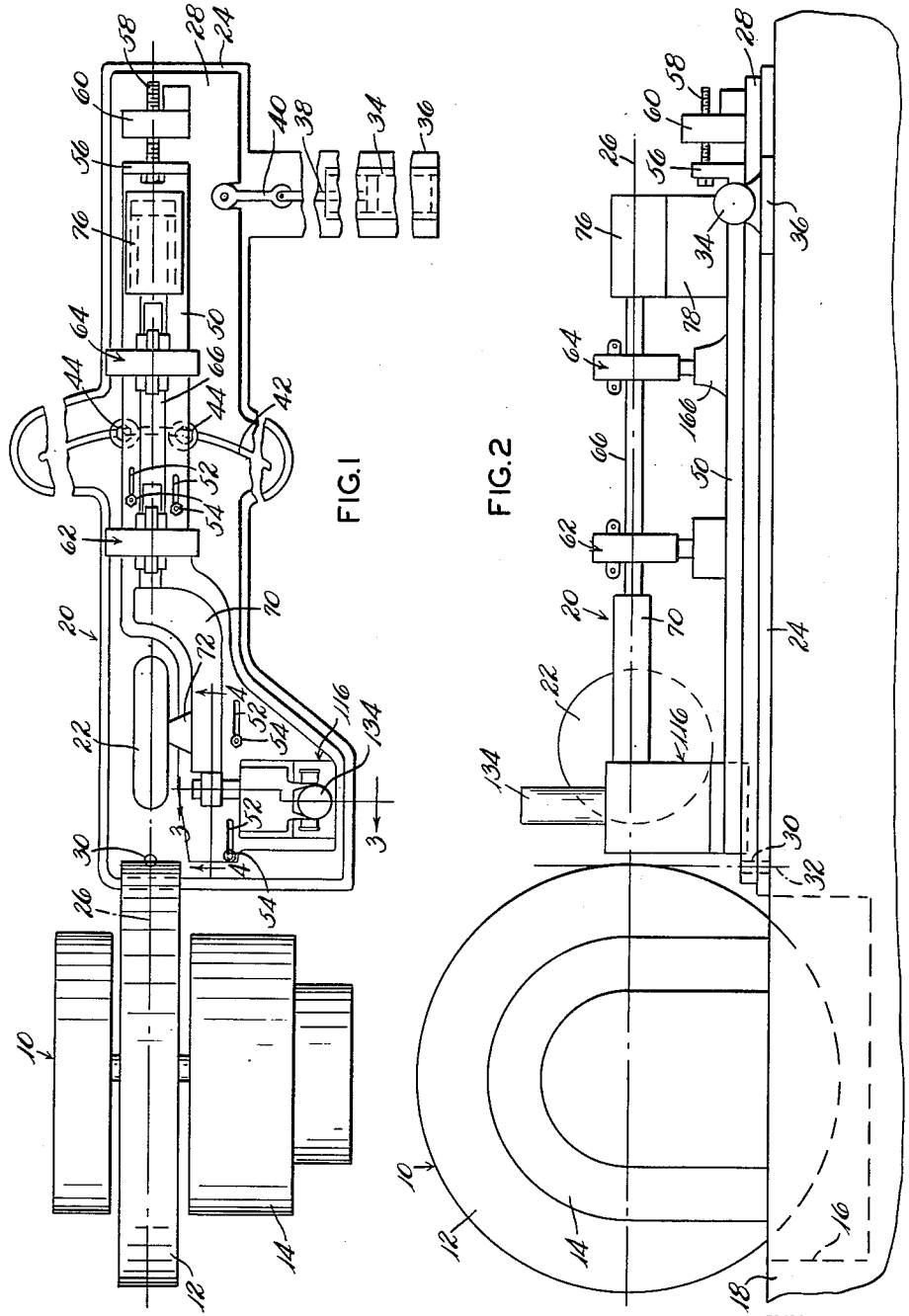
INVENTORS
RICHARD W. OBARSKI
HARRY A. TRISHMAN
REX C. SEANOR
BY Oldham & Oldham
ATTYS.

Oct. 30, 1962   R. W. OBARSKI ETAL   3,060,734
TIRE, WHEEL AND/OR BRAKE TESTING APPARATUS
Filed April 26, 1960                                                4 Sheets-Sheet 2
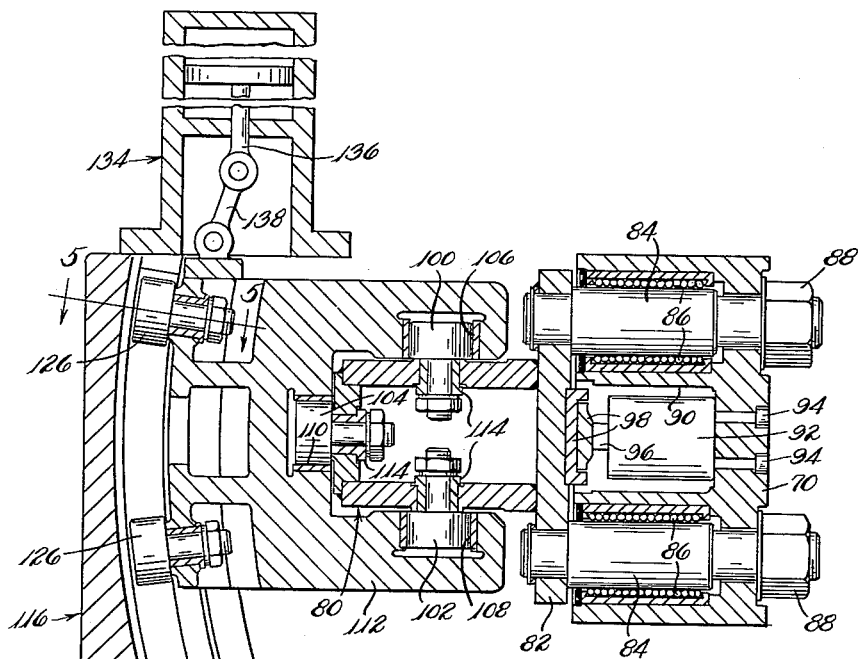
FIG.3
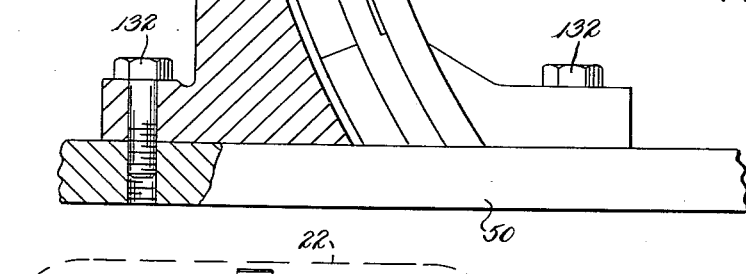
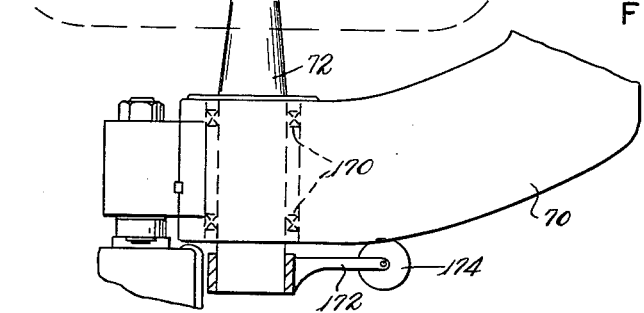
FIG.9
*INVENTORS*
RICHARD W. OBARSKI
HARRY A. TRISHMAN
REX C. SEANOR
BY Oldham & Oldham
ATTYS.

Oct. 30, 1962 R. W. OBARSKI ETAL 3,060,734
TIRE, WHEEL AND/OR BRAKE TESTING APPARATUS
Filed April 26, 1960 4 Sheets-Sheet 3
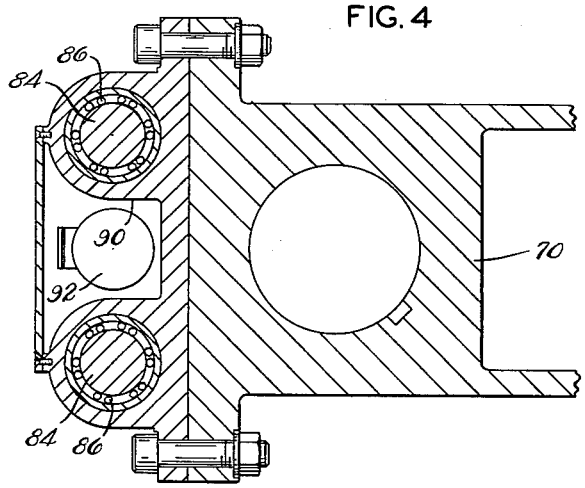
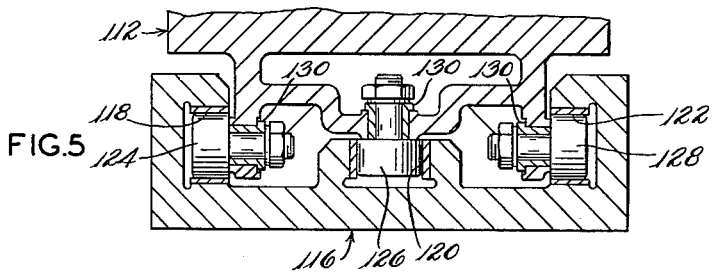
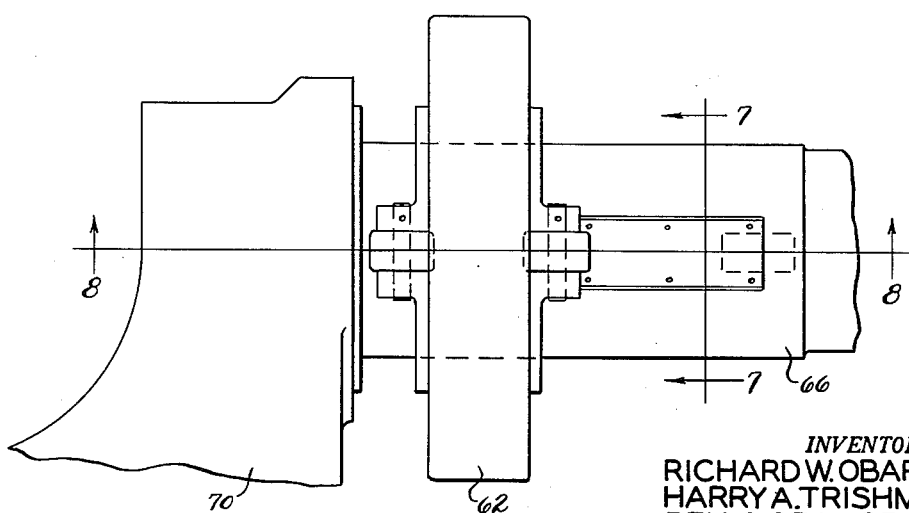
INVENTORS
RICHARD W. OBARSKI
HARRY A. TRISHMAN
REX C. SEANOR
By Oldham & Oldham
ATTYS.

Oct. 30, 1962 R. W. OBARSKI ETAL 3,060,734
TIRE, WHEEL AND/OR BRAKE TESTING APPARATUS
Filed April 26, 1960 4 Sheets-Sheet 4
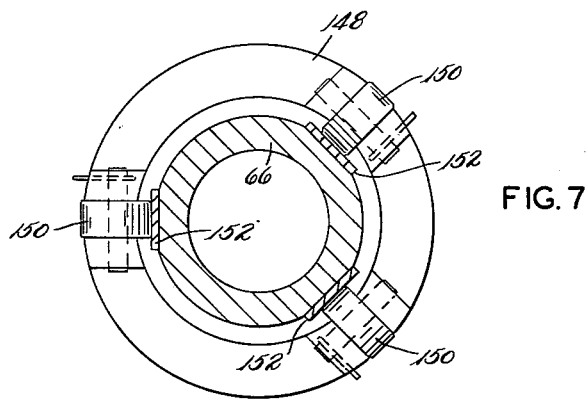
FIG. 7
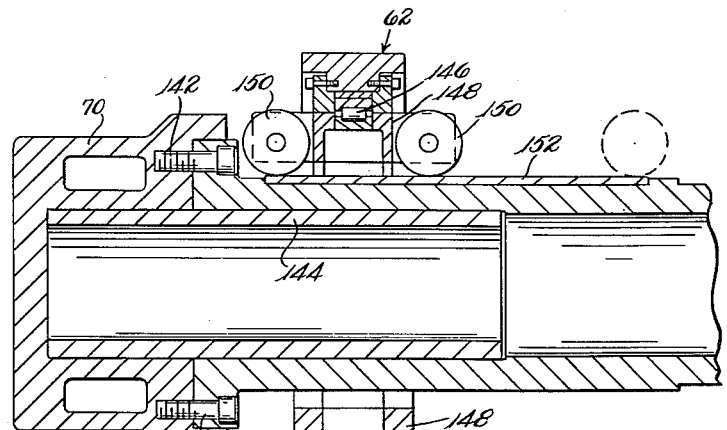
FIG. 8
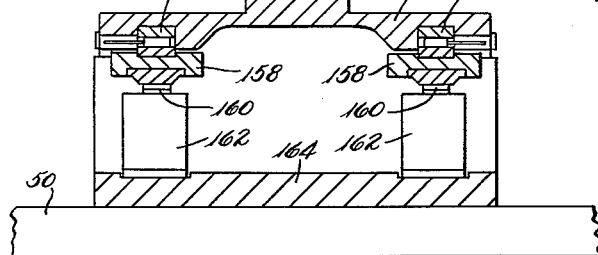
*INVENTORS*
RICHARD W. OBARSKI
HARRY A. TRISHMAN
REX C. SEANOR
BY Oldham & Oldham
ATTYS.

¹

3,060,734
TIRE, WHEEL AND/OR BRAKE TESTING
APPARATUS
Richard W. Obarski, Stow, Harry A. Trishman, Hudson, and Rex C. Seanor, Akron, Ohio, assignors to Adamson United Company, Akron, Ohio
Filed Apr. 26, 1960, Ser. No. 24,824
15 Claims. (Cl. 73—146)

This invention relates to apparatus of the type adapted to test tires, wheels, brakes, and the like, and wherein a tire or wheel is adapted to be moved into and out of contact with a rotating flywheel.

Apparatus of the character described has been provided heretofore, but with load requirements on tires and wheels constantly increasing, and with consistently greater brake energy absorption requirements, the result is that the size of the apparatus has necessarily increased creating problems of construction, operation, and maintenance. Moreover, existing equipment has not adapted itself to programming yaw or camber into the wheel or tire being tested, together with proper measurement of forces on the wheel or tire so programmed, and the weight and size of the moving parts has objectionably slowed down movement of the parts during test. Additionally, the mass and construction of known apparatus has often made mounting, demounting and the application of test connections to a tire, wheel or brake very difficult.

It is the general object of the invention to avoid and overcome the foregoing and other difficulties of and objections to prior known testing apparatus by the provision of a relatively simple, easily operated and maintained apparatus for testing wheels, tires, and the like, and wherein the weight of the tire supporting mechanism is kept to a minimum, and programmed yaw or camber are provided together with the provision of means for accurately measuring the forces on the rotating wheel or tire during such programming.

Another object of the invention is the provision of apparatus of the character described wherein the tire supporting carriage can be adjusted to or from the rotating flywheel to provide for testing of a wide variety of tire or wheel sizes with a minimum of bearing overhang of the shaft supporting the tire or wheel, together with fluid motor means for rapidly moving the tire or wheel to and from contact with the rotating flywheel, and with the force moving the tire or wheel into engagement with the flywheel acting in substantially direct alignment with the tire or wheel.

Another object of the invention is the provision of apparatus, such as described, wherein the tire or wheel to be tested is carried by a stub type cantilever axle carried in an L-shaped or quarter-circle half fork whose base is secured to a shaft having an axis extending substantially as a diameter of the tire or wheel being tested, whereby one complete side of the tire and wheel is exposed to facilitate mounting, demounting, etc., and whereby it is possible to program yaw or camber into the tire or wheel before or during testing without interference between the tire and wheel support and the rotating flywheel against which the tire or wheel to be tested is adapted to be moved.

Another object of the invention is the provision of an arcuate guide bracket supporting a guide block for arcuate movement in turn supporting a guide member for longitudinal movement, and whereby the cantilever mechanism carrying the tire or wheel is properly supported, and whereby the taking of force measurements during the testing operation is facilitated.

Another object of the invention is to provide test apparatus wherein the tire or wheel tested is carried on one-half of a fork mounted on a shaft whose axis when extended substantially bisects the tire or wheel, and with the shaft being mounted for both rotary and reciprocating movement in a pair of bearings spaced longitudinally of the shaft, with the bearing nearest the tire or wheel having limited lateral movement and carried on compression cells for measuring downward thrust upon the shaft.

Another object of the invention is to provide apparatus of the type described and adapted for use as a brake testing dynamometer.

The foregoing objects of the invention, and other objects which will become apparent as the description proceeds, are achieved by the provision of apparatus for testing tires, wheels, brakes and the like including a flywheel journalled on a horizontal axis, means for rotating the flywheel, a horizontal base positioned beneath a horizontal radius of the flywheel, a table pivotally mounted on the base for horizontal movement thereon about a vertical axis tangent to the flywheel, means for moving the table about said axis, a carriage mounted on the table for movement horizontally thereon to and from the flywheel, means for adjustably moving the carriage on the table, a pair of bearings on the carriage, a shaft mounted in the bearings in alignment with said horizontal radius of the flywheel, said bearings supporting the shaft for arcuate movement about its axis and for reciprocating movement on its axis, means fixed to the carriage for reciprocating the shaft, an L-shaped half fork fixed by the short leg of the L to the shaft with the long leg of the L extending substantially parallel to the axis of the shaft, a stub axle carried by the long leg of the L-shaped half fork and extending to intersect the axis of the shaft at right angles thereto, torque measuring means holding the axle against rotation in the fork, rolling means such as a wheel and tire rotatively mounted on the axle, a guide member, bearing means mounting the guide member on the end of the long leg of the L-shaped half fork for limited movement parallel to the axle, a compression load cell for limiting said movement and for measuring lateral forces thereon, a guide block movably mounting the guide member for reciprocating movement along with the shaft and parallel to the axis thereof, an arcuate guide bracket mounted on the carriage and movably mounting the guide block for arcuate movement about the axis of the shaft, means for controlling the arcuate position of the guide block in the arcuate guide bracket, means mounting the shaft bearing nearest the L-shaped half fork for limited lateral movement, and compression load cell means mounting said last-named means on the carriage and measuring vertical forces on the bearing.

In the drawings, FIG. 1 is a plan view of one embodiment of the apparatus incorporating the principles of the invention;

FIG. 2 is a side elevation of the apparatus of FIG. 1;

FIG. 3 is an enlarged cross-sectional view taken substantially on line 3—3 of FIG. 1 and illustrating in greater detail the arcuate bracket and associated mechanism for supporting the tire and wheel carrying member;

FIG. 4 is an enlarged vertical cross-sectional view, taken substantially on line 4—4 of FIG. 1 and illustrating additional details of the apparatus of FIG. 3;

FIG. 5 is a substantially horizontal cross-sectional view taken on line 5—5 of FIG. 3;

FIG. 6 is an enlarged fragmentary plan view of the bearing nearest to the tire and wheel and rotatably and reciprocably supporting the shaft carrying the tire and wheel;

FIG. 7 is a transverse vertical cross-sectional view taken substantially on line 7—7 of FIG. 6;

FIG. 8 is a longitudinal vertical sectional view taken substantially on line 8—8 of FIG. 6; and FIG. 9 is a fragmentary enlarged plan view of a portion of FIG. 1 better illustrating the brake torque measuring mechanism of the apparatus.

In the drawings, the numeral 10 indicates generally the flywheel portion of the apparatus, including a rotatable flywheel 12, usually mounted on a horizontal axis, and adpated to be driven by mechanism 14 of known type and forming no part of the present invention. The flywheel 12 or other portions of the apparatus 10 may extend into a well or recess 16 in the floor 18 upon which the apparatus is mounted. The flywheel 12 may be made up at least in part of plates which can be bolted to or detached from the sides of the flywheel to change the inertia thereof, all in accord with known constructions when the apparatus is to be used as a dynamometer to test brakes.

Positioned to one side of the apparatus 10, substantially in alignment with an extension of a horizontal radius of the flywheel 12 is the apparatus indicated as a whole by the numeral 20 for rotatably supporting a pneumatic tire 22, or the like, for test, the tire 22 being adapted to be moved to and from the flywheel 12. More particularly, the apparatus 20 includes a base 24 secured to the floor 18 below the chain-dotted line 26 representing an extension of a horizontal radius of the flywheel 12. Pivotally mounted on the base 24 is a table 28, the point 30 of pivotal support having an axis represented by a chain-dotted line 32 extending vertically from the pivot and lying tangent to the surface of the flywheel 12 at the middle thereof. Suitable means are provided for laterally moving the table 28 on the base 24 about the pivot 30, and these means may take the form of a fluid pressure cylinder 34 mounted on a lateral extension 36 of the base 24, the fluid pressure motor 34 having a piston rod 38 pivotally secured by a connecting rod 40 to the table 28. Suitable arcuate guide or spline means 42 are provided between the table 28 and the base 24, and in the embodiment of the invention illustrated these include arcuate slots 42 in the table 28 and bolts 44 extending through the slots 42 into the base 24.

It will be evident that operation of the fluid pressure motor 34 will move the table 28 horizontally about the pivot 30 on the base 24 to change the camber relation of the tire 22 with the surface of the flywheel 12 before or during the rolling movement of the tire 22 against the flywheel. By way of example only, camber movements in one or both directions of up to 25° or more may be provided.

Mounted upon the table 28 is a carriage 50 having adjustable movement toward and from the flywheel 12. Suitable spline or V-guide mountings between the table and carriage can be provided for this purpose but in the embodiment of the invention illustrated the carriage 50 is formed with longitudinally extending slots 52 through which extend bolts 54 secured to the table 28. In order to move the carriage 50 adjustably toward and from the flywheel 12 to provide for different tire or wheel sizes to be tested, the end of the carriage 50 remote from the flywheel 12 is formed with a vertically extending bracket 56 which fixedly supports a screw 58 in horizontal position. The screw 58 extends through a rotary nut mechanism 60 including a gear reducer and motor mounted on the table 28 so that rotation of the mechanism 60 causes the carriage 50 to move toward or from the flywheel 12. By way of example only, in the form of the invention shown the mechanism 60 adjusts the position of the carriage thirteen inches.

Mounted on the carriage 50 is the mechanism for rotatably supporting the tire 22, and this mechanism takes the form of a pair of bearings indicated as a whole by the numerals 62 and 64 for supporting a shaft 66 for both reciprocating movement in the bearings and relative arcuate movement therein. Secured to the end of the shaft 66 nearest to the flywheel 12 is a one-half fork member 70 carrying a stub axle 72 upon which the tire or wheel 22 is rotatably mounted. It will be understood that the axis of the shaft 66 is coinciednt with the horizontal radius 26 of flywheel 12, with the axis of the stub axle 22 extending at substantially right angles to and intersecting the line 26. By making the member 70 as one-half of a fork and utilizing a cantilever stub type axle 72 one entire side of the tire 22 and associated wheel member and stub axle is left exposed so that mounting and demounting of the tire and wheel, the application of a brake to the wheel, the placing of test instruments and test connections, and the like, is greatly simplified.

If the apparatus is not to be used for brake testing the stub axle 72 is fixed in the fork 70. If the apparatus is to be used to test brakes, that is as a dynamometer, the axle 72 is carried in the fork 70 as shown in FIG. 9.

The movement of the shaft 66 toward and from the flywheel 12 is normally achieved by connecting the end of the shaft 66 remote from the flywheel to a fluid pressure motor 76, preferably air, because its action is more rapid, mounted on a bracket 78 on the top of the carriage 50 near the bracket 56. The movement effected by the fluid pressure motor 76 is, for example, up to thirteen inches, and it will be understood that controlling the pressure in the motor 76 applies the tire 22 to the flywheel 12 with a controlled and/or variable force or loading.

The one-half fork or cantilever support for the tire 22 necessitates additional support for the fork member 70 and this is achieved by mechanism which will now be described. This mechanism not only provides the additional support but allows reciprocating and tilting movement of the fork member and the shaft 66 in the bearings 62 and 64. The tilting movement of the fork member 70 effects movement of the tire 22 in yaw in relation to the flywheel 12.

Having reference to FIGS. 3, 4 and 5, the end of the fork member 70 nearest the flywheel 12 supports a guide member, indicated as a whole by the numeral 80 for limited lateral movement thereon. The guide member 80 includes a vertically directed plate 82 having secured thereon a pair of horizontally directed studs 84 positioned in vertically spaced relationship to each other and received in ball bushings 86 in the end of the half fork 70. Nuts 88 on the studs 84 limit the ultimate lateral movement of the studs in the half fork member 70. The end of the half fork member 70 is provided with a recess 90 which receives a compression load cell 92 secured at one end by screws 94 to the fork member 70 and having a load measuring member 96 engaging through pressure plates 98 with the vertical plate 82 forming a part of the guide member 80. The load cell 92 is of the type which will resist and measure pressures up to 100,000 pounds upon relatively small deflections, such as .005 to .006 of an inch. Thus, the lateral movement of the guide member 80 on the half fork member 70 is actually limited by the compressive resistance of the load cell 92 and not by the nuts 88.

The guide member 80, made in hollow box form, such as seen in FIG. 3 rotatably journals a roller 100 at its top side, a roller 102 at its lower side, and a roller 104 at its outer side, these rollers being received between wear plates held in longitudinally extending grooves 106, 108 and 110 formed in a guide block, indicated as a whole by the numeral 112. Eccentric bushings, all indicated by the numeral 114, support the rollers 100, 102 and 104, so that the adjustment of the bushings 114 will position the plate 82 of the guide member 80 so that with no side load on the half fork member 70 the pressure cell 92 will read zero, but with proper clearance being provided between the plate 82 and the half fork member 70 so that a true pressure measurement by the compression load cell 92 can be had up to full load upon the application of lateral forces to the half fork member 70. Such lateral forces on the half fork member are carried through the load cell 92 to the guide member 80, and to the guide block 112.

It will be understood that the guide member 80 has longitudinal movement in the guide block 112 upon reciprocating movement of the tire 22 toward and from the flywheel 12 under the operation of the fluid pressure motor 76.

The guide block 112 is in turn carried for arcuate movement in a guide bracket indicated as a whole by the numeral 116. This is achieved by the provision of arcuate grooves 118, 120 and 122 in the guide bracket 116, these grooves slidably receiving pairs of rollers 124, 126 and 128 journalled on the guide block 112, as best seen in FIGS. 3 and 5. Eccentric bushings, all indicated by the numeral 130, are provided in the bearing supports for the rollers 124, 126 and 128 so that proper support mounting of the guide block 112 in the guide bracket 116 is achieved, all without interfering with the proper operation of the load cell 92, but insuring that the load applied to the load cell is carried through the guide member 80, the guide block 112 in the guide bracket 116 is achieved, all without interfering with the proper operation of the load cell 92, but insuring that the load applied to the load cell is carried through the guide member 80, the guide block 112 and to the guide bracket 116.

Means are provided, such as screws 132, for securing the guide bracket 116 to the carriage 50. Also means are provided for controlling the arcuate position of the guide block 112 in the guide bracket 116, and these means may take the form of a fluid pressure motor, indicated as a whole by the numeral 134, which is secured to the top of the guide bracket 116, and with the piston rod 136 of the motor 134 being pivotally secured by a connecting rod 138 to the guide block 112. The operation of the motor 134 thus controls the arcuate position of the guide block 112 in the guide bracket 116 and controls the yaw relationship of the tire 22 with the flywheel 12. It is possible to program a controlled or varying yaw into the operation of the apparatus while the tire 22 is actually in engagement with the rotating flywheel 12, or the yaw can be put into the tire mounting before the tire is moved into engagement with the flywheel. In the apparatus illustrated a yaw of up to 15° or more is provided, dependent, of course, upon test requirements.

Returning now to a more detailed consideration of the mounting of the shaft 66 for reciprocating and arcuate movement in the bearings 62 and 64, reference should be had to FIGS. 6, 7, and 8. These drawings illustrate that the shaft member 66 is normally made hollow, with the half fork member 70 being secured to the end of the shaft by screws 142, and with a dowel sleeve 144 being provided between the parts. The ring bearing 62 is in the form of a ring which internally supports a roller bearing 146 of circular shape carrying internally a circular channel 148 upon which is mounted at load-carrying spacings around the shaft 66 pairs of rollers 150 having longitudinal rolling engagement with wear plates 152 secured to the shaft to allow reciprocating movement of the shaft under the action of the fluid pressure motor 76. Arcuate movement of the shaft 66 is under the control of the fluid pressure motor 134. Such arcuate movement causes all parts radially inside the circular roller bearing 146, namely the circular channel 148 and the rollers 150, to turn with the shaft 66.

The bearing 62 is mounted on a plate 154 carried on laterally extending horizontal bearings 156 of the ladder type, and the bottom of these bearings are supported upon pressure plates 158 engaging with the load measuring members 160 of compression load cells 162 (for example, four) mounted upon a plate 164 secured to the carriage 50. The ladder bearings 156 allow limited lateral movement of the bearing 62 for the unrestricted operation of the lateral load cell 92, and the load cells 162, similar to the load cell 92, act to measure the vertical forces upon the bearing 62.

The bearing 64 is like bearing 62 except it is mounted upon a fixed bracket 166 secured to the carriage 50. It can be said that the limited movements of the shaft 66 as provided for and resisted by the load cells 92 and 162 act to pivot around the back bearing 64 supporting the shaft 66.

FIG. 9 shows how stub axle 72 is or may be mounted in rotary bearings 170, and with a torque arm 172 secured to the end of the axle and in turn connected to a pressure measuring cylinder or load cell 174 mounted on the fork member 70 whereby the apparatus can be used as a dynamometer to test a wheel brake carried on the axle.

It will be recognized that the apparatus is capable of a wide variety of tire, wheel and/or brake testing operations including wheel and tire landing and take-off tests, brake tests, roll life and load tests, etc., with or without initial or programmed camber and yaw. Not all of these will be described. In one typical test, for example for an airplane tire landing test, the tire, wheel and/or brake to be tested is readily mounted on the stub axle 72, this being fully exposed from one side, and the mechanism 60 is operated to position the carriage 50 so that the tire 22 is in clearance relation, usually close, with the flywheel 12. Moving the carriage 50 simultaneously moves the bearings 62 and 64, together with the guide bracket 116 and this means that at all times the overhang between the axle 72 and the bearing 62 is kept to a minimum. The flywheel 12 is brought up to the desired speed whereupon the fluid pressure motor 76 is actuated to move the shaft 66 and half fork member 70 towards the flywheel to very quickly bring the tire 22 into engagement with the flywheel, and with the tire 22 being loaded to the desired amount against the surface of the flywheel by the force of the fluid pressure motor 76.

It will be understood that a camber can be put on the tire 22 in its relationship to the flywheel 12 by the operation of the fluid pressure motor 34. This motor moves the table 28 and carriage 50 in relation to the base 24 of the apparatus 20. This camber can be placed on the tire 22 prior to the movement of the tire 22 against the flywheel 12, or it can be programmed onto the tire in a progressive movement after the tire contacts the flywheel. In like manner, a yaw can be placed on the tire 22 by the operation of the fluid pressure motor 134 prior to moving the tire into contact with the flywheel, or this yaw can be programmed onto the tire after it has contacted the flywheel, all as will be understood.

The terms camber and yaw, used to describe the tilting movement of the tire 22 with respect to the flywheel 12 are employed as if the surface of the flywheel engaged by the tire was horizontal, and with the tire being applied vertically down against this surface.

The compression load cell 92 measures any side thrust on the tire 22 up to the pressure limit of the load cell, or a combination of side and vertical forces, and the compression load cells 162 measure the vertical load forces on the front bearing 62 carrying the shaft 66, so that these forces, together with the remaining known and usual measurements performed by a dynamometer, for example, the force on load cell 174, can be employed to calculate the effectiveness of a tire, wheel, and/or brake, or the like, tested by the apparatus.

While in accord with the patent statutes one best known embodiment of the invention has been illustrated and described in detail, it is to be particularly understood that the invention is not to be limited thereto or thereby, but that its scope is defined in the appended claims.

What is claimed is:

1. Apparatus for testing tires, wheels, brakes and the like including a flywheel journalled on a horizontal axis, means for rotating the flywheel, a horizontal base positioned beneath a horizontal radius of the flywheel, a table pivotally mounted on the base for horizontal movement thereon about a vertical axis tangent to the flywheel, means for moving the table about said axis, a carriage mounted on the table for movement horizontally thereon to and from the flywheel, means for adjustably moving the carriage on the table, a pair of bearings on the carriage, a shaft mounted in the bearings in alignment with said horizontal radius of the flywheel, said bearings supporting the shaft for arcuate movement about its axis and for reciprocating movement on its axis, means fixed to the carriage for reciprocating the shaft, an L-shaped half fork fixed by the short leg of the L to the shaft with the long leg of the L extending substantially parallel to the axis of the shaft, a stub axle carried in the long leg of the L-shaped half fork and extending to intersect the axis of the shaft at right angles thereto, torque measuring means holding the axle against rotation in the fork, said axle being adapted to mount rolling means such as a wheel and tire rotatively thereon, a guide member, bearing means mounting the guide member on the end of the long leg of the L-shaped half fork for limited movement parallel to the axle, a compression load cell for limiting said movement and for measuring lateral forces thereon, a guide block movably mounting the guide member for reciprocating movement along with the shaft and parallel to the axis thereof, an arcuate guide bracket mounted on the carriage and movably mounting the guide block for arcuate movement about the axis of the shaft, means for controlling the arcuate position of the guide block in the arcuate guide bracket, means mounting the shaft bearing nearest the L-shaped half fork for limited lateral movement, and compression load cell means mounting said last-named means on the carriage and measuring vertical forces on the bearing.

2. Apparatus for testing tires,, wheels, brakes and the like including a flywheel journalled on a horizontal axis, means for rotating the flywheel, a horizontal base positioned beneath a horizontal radius of the flywheel, a carriage mounted on the base for movement horizontally thereon to and from the flywheel, means for adjustably moving the carriage on the base, a pair of bearings on the carriage, a shaft mounted in the bearings in alignment with said horizontal radius of the flywheel, said bearings supporting the shaft for arcuate movement about its axis and for reciprocating movement on its axis, means fixed to the carriage for reciprocating the shaft, an L-shaped half fork fixed by the short leg of the L to the shaft with the long leg of the L extending substantially parallel to the axis of the shaft, a stub axle on the long leg of the L-shaped half fork and extending to intersect the axis of the shaft at right angles thereto, said axle being adapted to mount rolling means such as wheel and tire rotatively thereon, a guide member, bearing means mounting the guide member on the end of the long leg of the L-shaped half fork for limited movement parallel to the axle, a compression load cell for limiting said movement and for measuring lateral forces thereon, a guide block movably mounting the guide member for reciprocating movement along with the shaft and parallel to the axis thereof, an arcuate guide bracket mounted on the carriage and movably mounting the guide block for arcuate movement about the axis of the shaft, means for controlling the arcuate position of the guide block in the arcuate guide bracket, means mounting the shaft bearing nearest the L-shaped half fork for limited lateral movement, and compression load cell means mounting said last-named means on the carriage and measuring vertical forces on the bearing.

3. Apparatus for testing tires, wheels, brakes and the like including a flywheel journalled on a horizontal axis, means for rotating the flywheel, a horizontal base positioned beneath a horizontal radius of the flywheel, a pair of bearings on the base, a shaft mounted in the bearings in alignment with said horizontal radius of the flywheel, said bearings supporting the shaft for arcuate movement about its axis and for reciprocating movement on its axis, means fixed to the base for reciprocating the shaft, an L-shaped half fork fixed by the short leg of the L to the shaft with the long leg of the L extending substantially parallel to the axis of the shaft, a stub axle on the long leg of the L-shaped half fork and extending to intersect the axis of the shaft at right angles thereto, said axle being adapted to mount rolling means such as a wheel and tire rotatively thereon, a guide member, bearing means mounting the guide member on the end of the long leg of the L-shaped half fork for limited movement parallel to the axle, a compression load cell for limiting said movement and for measuring lateral forces thereon, a guide block movably mounting the guide member for reciprocating movement along with the shaft and parallel to the axis thereof, an arcuate guide bracket mounted on the base and movably mounting the guide block for arcuate movement about the axis of the shaft, means for controlling the arcuate position of the guide block in the arcuate guide bracket, means mounting the shaft bearing nearest the L-shaped half fork for limited lateral movement, and compression load cell means mounting said last-named means on the carriage and measuring vertical forces on the bearing.

4. Apparatus for testing tires, wheels, brakes and the like including a flywheel, means for rotating the flywheel, a base, a pair of bearings on the base, a shaft mounted in the bearings in alignment with a radius of the flywheel, said bearings supporting the shaft for arcuate movement about its axis and for reciprocating movement on its axis, means for reciprocating the shaft, an L-shaped half fork fixed by the short leg of the L to the shaft with the long leg of the L extending substantially parallel to the axis of the shaft, a stub axle on the long leg of the L-shaped half fork and extending to intersect the axis of the shaft at right angles thereto, said axle being adapted to mount rolling means such as a wheel and tire rotatively thereon, a guide member, bearing means mounting the guide member on the end of the long leg of the L-shaped half fork for limited movement parallel to the axle, a compression load cell for limiting said movement and for measuring lateral forces thereon, a guide block movably mounting the guide member for reciprocating movement along with the shaft and parallel to the axis thereof, an arcuate guide bracket mounted on the base and movably mounting the guide block for arcuate movement about the axis of the shaft, means for controlling the arcuate position of the guide block in the arcuate guide bracket, means mounting the shaft bearing nearest the L-shaped half fork for limited lateral movement, and compression load cell means mounting said last-named means on the carriage and measuring vertical forces on the bearing.

5. Apparatus for testing tires and the like, including a flywheel, means for rotating the flywheel, an axle adapted to rotatatively mount a tire, cantilever mechanism supporting the axle to position any tire on the axle in rolling engagement with the flywheel, means mounting the mechanism for adjustable movement toward and from the flywheel on a radius thereof, other means associated with the mechanism for rapidly moving the mechanism to move any tire on the axle to and from engagement with the flywheel, said means acting in direct alignment with a radius of the flywheel, means mounting the mechanism for changing the camber of a tire in its rolling relation with the flywheel, means mounting the mechanism for changing the yaw of a tire in its rolling relation with the flywheel, means for measuring the side thrust on a tire during its rolling engagement with the flywheel, and means for measuring the thrust on a tire at an angle to the side thrust during its rolling engagement with the flywheel.

6. In an apparatus for testing tires and the like, a flywheel, means for rotating the flywheel, an axle adapted to mount a tire, cantilever mechanism mounting the axle to support a tire for rolling engagement with the flywheel, means mounting the mechanism for adjustable movement toward and from the flywheel on a radius thereof, other means associated with the mechanism for rapidly moving the axle to position a tire to and from engagement with the flywheel, said means acting in direct alignment with a radius of the flywheel, means mounting the mechanism for changing the camber of the axle in relation with the flywheel, and means mounting the mechanism for changing the yaw of the axle in relation with the flywheel.

7. Apparatus for testing tires and the like including a flywheel, means for rotating the flywheel, an axle adapted to mount a tire, cantilever mechanism mounting the axle to support a tire for rolling engagement with the flywheel, means mounting the mechanism for adjustable movement toward and from the flywheel, other means associated with the mechanism for rapidly moving the axle to move a tire to and from engagement with the flywheel, means mounting the mechanism for changing the camber of the axle in relation with the flywheel, means mounting the mechanism for changing the yaw of the axle in relation with the flywheel, means for measuring the side thrust on the axle, means for measuring the thrust on the axle at substantially right angles to the side thrust and means for measuring torque on the axle.

8. In an apparatus for testing tires and the like, a flywheel, means for rotating the flywheel, a cantilever mechanism having means to rotatably mount a tire for rolling engagement with the flywheel, means mounting the mechanism for adjustable movement toward and from the flywheel, other means associated with the mechanism for rapidly moving the tire mounting means to and from the flywheel, means mounting the mechanism for changing the camber of the tire mounting means in its relation with the flywheel, means mounting the mechanism for changing the yaw of the tire mounting means in its relation with the flywheel and means for measuring the forces on the tire mounting means.

9. In an apparatus for testing tires and the like, a flywheel, means for rotating the flywheel, a mechanism having means to rotatably mount a tire for rolling engagement with the flywheel, means associated with the mechanism for rapidly moving the tire mounting means to and from the flywheel, said means acting in direct alignment with a radius of the flywheel, means mounting the mechanism for changing the camber of the tire mounting means in its relation with the flywheel, means for measuring the side thrust on the tire mounting means and means for measuring the thrust on the tire mounting means at an angle to the side thrust.

10. The combination in an apparatus for testing tires and the like of a flywheel, a prime mover for rotating the flywheel, a stub axle for rotatably supporting a wheel and tire, a cantilever half fork support for the axle leaving one side of the wheel and tire completely exposed, a shaft carrying the half fork support, means journalling the shaft for arcuate movement and for reciprocating movement on a radius of the flywheel, means for effecting reciprocating movement of the shaft to move the axle to and from the flywheel, means engaging the half fork support for guiding and supporting it for both reciprocating and arcuate movement, means for effecting arcuate movement of the half fork support about the axis of the shaft, and means for measuring forces on a tire in alignment with the axle, in the direction of the plane of the flywheel, and against the flywheel.

11. The combination in an apparatus for testing tires and the like of a flywheel, a prime mover for rotating the flywheel, a stub axle for rotatably supporting a wheel and tire, a cantilever half fork support for the axle leaving one side of the wheel and tire completely exposed, a shaft carrying the half fork support, means journalling the shaft for arcuate movement and for reciprocating movement on a radius of the flywheel, means for effecting reciprocating movement of the shaft to move the axle to and from the flywheel, means engaging the half fork support for guiding and supporting it for both reciprocating and arcuate movement, and means for effecting arcuate movement of the half fork support about the axis of the shaft.

12. The combination in an apparatus for testing tires and the like of a flywheel, a prime mover for rotating the flywheel, a stub axle for rotatably supporting a wheel and tire, a cantilever half fork support for the axle leaving one side of the wheel and tire completely exposed, a shaft carrying the half fork support, means journalling the shaft for arcuate movement and for reciprocating movement on a radius of the flywheel, means for effecting reciprocating movement of the shaft to move the axle to and from the flywheel, means engaging the half fork support for guiding and supporting it for both reciprocating and arcuate movement, means for effecting arcuate movement of the half fork support about the axis of the shaft, mechanism mounting all of the named means for swinging movement out of the plane of the flywheel, and means for effecting the swinging movement of said mechanism, and means for measuring the forces on the stub axle.

13. In an apparatus for testing tires and the like, a flywheel, means for rotating the flywheel, a cantilever mechanism having means for rotatably mounting a tire for rolling engagement with the flywheel, means mounting the mechanism for adjustable movement toward and from the flywheel on a radius thereof, other means associated with the mechanism for rapidly moving the tire mounting means to and from the flywheel, said means acting in direct alignment with a radius of the flywheel, and means mounting the mechanism for progressively changing the camber of the tire mounting means in its relation with the flywheel.

14. In an apparatus for testing tires and the like, a flywheel, means for rotating the flywheel, a cantilever mechanism having means for rotatably mounting a tire for rolling engagement with the flywheel, means mounting the mechanism for adjustable movement toward and from the flywheel on a radius thereof, other means associated with the mechanism for rapidly moving the tire mounting means to and from the flywheel, said means acting in direct alignment with a radius of the flywheel, and means mounting the mechanism for progressively changing the yaw of the tire in its rolling relation with the flywheel during the time of engagement of the tire with the flywheel.

15. The combination in an apparatus for testing tires and the like of a flywheel, a prime mover for rotating the flywheel, a stub axle adapted to rotatably support a wheel and tire, a cantilever half fork support for the axle leaving one side of the wheel and tire completely exposed, a shaft carrying the half fork support, means journalling the shaft for arcuate movement and for reciprocating movement on a radius of the flywheel, means for effecting reciprocating movement of the shaft to move the axle to and from the flywheel, means engaging the half fork support for guiding and supporting it for both recriprocating and arcuate movement, means for effecting arcuate movement of the half fork support about the axis of the shaft, means mounting the shaft journalling means to swing the shaft angularly out of the plane of the flywheel, and means to measure the forces on the stub axle.

References Cited in the file of this patent

UNITED STATES PATENTS 2,016,943    Leflar _____ Oct. 8, 1935

FOREIGN PATENTS 289,097    Switzerland _____ June 16, 1953